United States Patent
Watfa et al.

(10) Patent No.: US 9,961,592 B2
(45) Date of Patent: May 1, 2018

(54) ENHANCEMENTS FOR OPERATION OF A TIMER

(71) Applicant: INTERDIGITAL PATENT HOLDINGS, INC., Wilmington, DE (US)

(72) Inventors: Mahmoud Watfa, Saint Leonard (CA); Behrouz Aghili, Commack, NY (US); Ulises Olvera-Hernandez, Kirkland (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 15 days.

(21) Appl. No.: 14/556,939

(22) Filed: Dec. 1, 2014

(65) Prior Publication Data
US 2015/0085827 A1  Mar. 26, 2015

Related U.S. Application Data

(63) Continuation of application No. 12/615,762, filed on Nov. 10, 2009, now Pat. No. 8,903,376.
(Continued)

(51) Int. Cl.
*H04W 4/00* (2009.01)
*H04W 36/00* (2009.01)
*H04W 76/02* (2009.01)

(52) U.S. Cl.
CPC ..... *H04W 36/0022* (2013.01); *H04W 76/027* (2013.01)

(58) Field of Classification Search
CPC ..... H04W 36/00; H04W 36/02; H04W 36/16; H04W 36/0005
See application file for complete search history.

(56) References Cited

U.S. PATENT DOCUMENTS

| 6,542,499 B1 | 4/2003 | Murphy et al. |
| 7,251,227 B2 | 7/2007 | De Jong et al. |

(Continued)

FOREIGN PATENT DOCUMENTS

| KR | 10-2008-0012285 | 2/2008 |
| TW | 200843417 | 11/2008 |

(Continued)

OTHER PUBLICATIONS

"Korean Office Action", Korean Patent Application No. 10-2013-7005798, dated Sep. 23, 2015, 4 pages.
(Continued)

*Primary Examiner* — Andrew Chriss
*Assistant Examiner* — Kenan Cehic
(74) *Attorney, Agent, or Firm* — Eric Berkowitz

(57) ABSTRACT

A method and an apparatus for operating a timer in an integrated circuit (IC) are disclosed herein. The IC includes a timer, a receiver configured to receive a circuit switched (CS) service notification, a transmitter configured to transmit an evolved packet system mobility management extended service request (ESR) message, and a processor configured to start the timer in response to transmitting the ESR and stop the timer in response to reception of a handover command and completion of a CS fallback procedure by the receiver, wherein the handover command directs the IC to handover to another radio access technology (RAT) so that a CS call may be established. The processor may be configured to stop the timer in response to reception of a cell change command and completion of a CS fallback procedure by the receiver, wherein the cell change command directs the IC to perform a cell change procedure.

2 Claims, 7 Drawing Sheets

Related U.S. Application Data

(60) Provisional application No. 61/166,071, filed on Apr. 2, 2009, provisional application No. 61/112,880, filed on Nov. 10, 2008.

(56) References Cited

U.S. PATENT DOCUMENTS

| | | | |
|---|---|---|---|
| 8,135,419 | B2 | 3/2012 | Wang et al. |
| 8,144,664 | B2 | 3/2012 | Pani et al. |
| 8,279,834 | B2 | 10/2012 | Mildh |
| 8,320,327 | B2 | 11/2012 | Pani et al. |
| 8,515,463 | B2 | 8/2013 | Tomizu |
| 2006/0239229 | A1 | 10/2006 | Marinescu et al. |
| 2007/0249352 | A1* | 10/2007 | Song .................. H04L 63/08 455/436 |
| 2008/0080428 | A1 | 4/2008 | Jappila et al. |
| 2010/0099402 | A1 | 4/2010 | Wu |
| 2013/0107863 | A1 | 5/2013 | Faccin et al. |

FOREIGN PATENT DOCUMENTS

| | | |
|---|---|---|
| WO | WO-2006/118426 | 11/2006 |
| WO | 2007/092788 | 8/2007 |
| WO | WO-2008/125652 | 10/2008 |
| WO | 2009/142581 | 11/2009 |

OTHER PUBLICATIONS

"Korean Office Action (English Translation)", Korean Patent Application No. 10-2013-7005798, dated Sep. 23, 2015, 4 pages.
"3rd Generation Partnership Project; Technical Specification Group Radio Access Network and Terminals; Non-Access-Stratum (NAS) protocol for Evolved Packet System (EPS); Stage 3 (Release 8)", 3GPP TS 24.301 V8.1.0, Mar. 2009, 250 pages.
"3rd Generation Partnership Project; Technical Specification Group Services and System Aspects; Circuit Switched Fallback in Evolved Packet System; Stage 2 (Release 8)", 3GPP TS 23.272 V8.3.0, Mar. 2009, 47 pages.
U.S. Appl. No. 61/038,701, filed Mar. 2008, Mukherjee.
Ericsson et al., "Correction to conditions for EMM initiating service request," 3GPP TSG-CT WG1 Meeting #61, C1-094216, (Oct. 2009).
Huawei et al., "Iu-CS based CS fallback architecture," 3GPP TSG SA WG2 Meeting #63, TD S2-081755 (Feb. 18-22, 2008).
Huawei, "CS Fallback solution with SRVCC Alt-E," 3GPP TSG SA WG2 Meeting #62, TD S2-080187 (Jan. 14-18, 2008).
Huawei, "Iu-CS based CS fallback architecture," 3GPP TSG SA WG2 Meeting #63, TD S2-081079 (Feb. 18-22, 2008).
Interdigital LLC, "EPS Bearer Context Synchronization during Extended Service Request," 3GPP TSG-CT WG1 Meeting #62, C1-095170 (Nov. 9-13, 2009).
NEC, "Enhanced CS fallback to 1xRTT," 3GPP TSG-CT WG1 Meeting #62, C1-095514 (Nov. 9-13, 2009).
NEC, "Supervision timer for the extended service request procedure," 3GPP TSG CT WG1 Meeting #57, C1-090303 (Feb. 9-19, 2009).
Nokia et al., "Pseudo-CR on introduction of Extended Service Request," 3GPP TSG CT WG1 Meeting #55bis, C1-085520 (Oct. 6-10, 2008).
Nokia et al., "Pseudo-CR on introduction of Extended Service Request," 3GPP TSG CT WG1 Meeting #55bis, C1-084001 (Oct. 2008).
Nokia et al., "Pseudo-CR on introduction of Extended Service Request," 3GPP TSG CT WG1 Meeting #55bis, C1-085191 (Oct. 6-10, 2008).
NTT Docomo, "CR on 24.008—CSFB timer," 3GPP TSG CT WG1 Meeting #55bis, C1-083661 (Oct. 2008).
Third Generation Partnership Project, "Technical Specification Group Services and System Aspects; Circuit Switched Fallback in Evolved Packet System; Stage 2 (Release 8)," 3GPP TS 23.272 V8.1.0 (Sep. 2008).
Third Generation Partnership Project, "Technical Specification Group Services and System Aspects; Circuit Switched Fallback in Evolved Packet System; Stage 2 (Release 8)," 3GPP TS 23.272 V8.5.0 (Sep. 2009).
Third Generation Partnership Project, "Technical Specification Group Services and System Aspects; Circuit Switched Fallback in Evolved Packet System; Stage 2 (Release 9)," 3GPP TS 23.272 V9.0.0 (Sep. 2009).
Third Generation Partnership Project, "Technical Specification Group Core Network and Terminals; Non-Access-Stratum (NAS) protocol for Evolved Packet System (EPS); Stage 3 (Release 8)," 3GPP TS 24.301 V1.1.1 (Oct. 2008).
Third Generation Partnership Project, "Technical Specification Group Core Network and Terminals; Non-Access-Stratum (NAS) protocol for Evolved Packet System (EPS); Stage 3 (Release 8)," 3GPP TS 24.301 V8.3.0 (Sep. 2009).
Third Generation Partnership Project, "Technical Specification Group Core Network and Terminals; Non-Access-Stratum (NAS) protocol for Evolved Packet System (EPS); Stage 3 (Release 9)," 3GPP TS 24.301 V9.0.0 (Sep. 2009).
Third Generation Partnership Project, "Technical Specification Group Radio Access Network; Evolved Universal Terrestrial Radio Access (E-UTRA) Radio Resource Control (RRC); Protocol specification (Release 8)," 3GPP TS 36.331 V8.3.0 (Sep. 2008).
Third Generation Partnership Project, "Technical Specification Group Radio Access Network; Evolved Universal Terrestrial Radio Access (E-UTRA) Radio Resource Control (RRC); Protocol specification (Release 9)," 3GPP TS 36.331 V9.0.0 (Sep. 2009).
"Japanese Notice of Allowance", Japanese Application No. 2015-118328, dated Dec. 6, 2016, 3 pages.
"Japanese Notice of Allowance (English Translation)", Japanese Application No. 2015-118328, dated Dec. 6, 2016, 3 pages.
"Japanese Notice of Rejection", Japanese Application No. 2015-118328, dated Apr. 19, 2016, 3 pages.
"Japanese Notice of Rejection (English Translation)", Japanese Application No. 2015-118328, dated Apr 19, 2016, 3 pages.
Panasonic, "Pseudo-CR on <Service Request completion for CS fallback>", 3GPP Tdoc C1-084591; 3GPP TSG CT WG1 Meeting #56; 3GPP TS <24.301 v1.1.1>, Shanghai, P.R. China, Nov. 10-14, 2008, 6 pages.

* cited by examiner

ENHANCEMENTS FOR OPERATION OF A TIMER

CROSS REFERENCE TO RELATED APPLICATION

This application is a continuation of U.S. patent application Ser. No. 12/615,762 filed Nov. 10, 2009, which issues as U.S. Pat. No. 8,903,376 on Dec. 2, 2014, which claims the benefit of U.S. Provisional Application Nos. 61/112,880, filed Nov. 10, 2008 and 61/166,071, filed Apr. 2, 2009, which are incorporated by reference as if fully set forth herein.

FIELD OF INVENTION

This application is related to wireless communications.

BACKGROUND

FIG. 1 shows an overview of an Evolved Universal Mobile Telecommunications System (UMTS) Terrestrial Radio Access Network (E-UTRAN) 100 in accordance with the prior art. As shown in FIG. 1, E-UTRAN 100 includes three eNodeBs (eNBs) 102, however, any number of eNBs may be included in E-UTRAN 100. The eNBs 102 are interconnected by an X2 interface 108. The eNBs 102 are also connected by an S1 interface 106 to the Evolved Packet Core (EPC) 104. The EPC 104 includes a Mobility Management Entity (MME) 108 and a Serving Gateway (S-GW) 112.

FIG. 2 is a flow diagram of a service request procedure 200 in accordance with the prior art. At step 202, a WTRU transmits a SERVICE REQUEST message to an eNB. At step 204, the WTRU starts a timer, such as timer T3417ext, for example. At step 206, the WTRU enters EMM-SERVICE-REQUEST-INITIATED state. At step 208, the WTRU determines that a user plane radio bearer is set up and therefore the procedure is successful. At step 210, the WTRU stops the timer and enters an EMM-REGISTERED state.

FIG. 3 is a signal diagram of a service request procedure 300 in accordance with the prior art. An eNB 302 transmits a circuit switched (CS) call request 304 to a WTRU 306. The eNB 302 also transmits a CS service notification 308 to the WTRU 306. The WTRU 306 responds to the eNB 302 with an extended service request (ESR) message 310. The WTRU 306 then starts a timer 312. If the NAS security mode control procedure is completed 314, or if NAS radio bearers are established 316 or a service reject message 318 is received by the WTRU 306, the timer is stopped 320.

If the WTRU 306 is in an EMM-CONNECTED mode when the ESR 310 is transmitted to the network, NAS security 314 may already be established. Furthermore, if the WTRU receives a change cell message or a handover command, no bearers are setup. Consequently, other than receiving a service reject message, which indicates a failure of the service request procedure, the WTRU will not stop the timer even though the service request procedure was successful.

In addition, if the WTRU 306 is in EMM-IDLE mode and transmits a service request message 310 to the eNB 302 for a CS fallback request, the network may not initiate the security mode procedure. The security mode procedure is a network operator option and may not be implemented by all operators. In this instance, the WTRU 306 may not use the completion of the security mode procedure as an indication to stop the timer, and the timer may continue to run.

The foregoing discussion with respect to LTE is provided as an example and may have applicability to other wireless technologies and standards. Furthermore, while the foregoing discussion is with respect to a timer, one skilled in the art may recognize that any time keeping or control device, such as a counter, may be used in place of the timer.

SUMMARY

A method and an apparatus for operating a timer in an integrated circuit (IC) are disclosed herein. The IC includes a timer, a receiver configured to receive a circuit switched (CS) service notification, a transmitter configured to transmit an evolved packet system mobility management extended service request (ESR) message, and a processor configured to start the timer in response to transmitting the ESR and stop the timer in response to reception of a handover command and completion of a CS fallback procedure by the receiver, wherein the handover command directs the IC to handover to another radio access technology (RAT) so that a CS call may be established. The processor may be configured to stop the timer in response to reception of a cell change command and completion of a CS fallback procedure by the receiver, wherein the cell change command directs the IC to perform a cell change procedure.

BRIEF DESCRIPTION OF THE DRAWINGS

A more detailed understanding may be had from the following description, given by way of example in conjunction with the accompanying drawings wherein.

DETAILED DESCRIPTION

When referred to hereafter, the terminology "wireless transmit/receive unit (WTRU)" includes but is not limited to a user equipment (UE), a mobile station, a fixed or mobile subscriber unit, a pager, a cellular telephone, a personal digital assistant (PDA), a computer, or any other type of user device capable of operating in a wireless environment. When referred to hereafter, the terminology "base station" includes but is not limited to a Node-B, a site controller, an access point (AP), or any other type of interfacing device capable of operating in a wireless environment.

Figure 4:
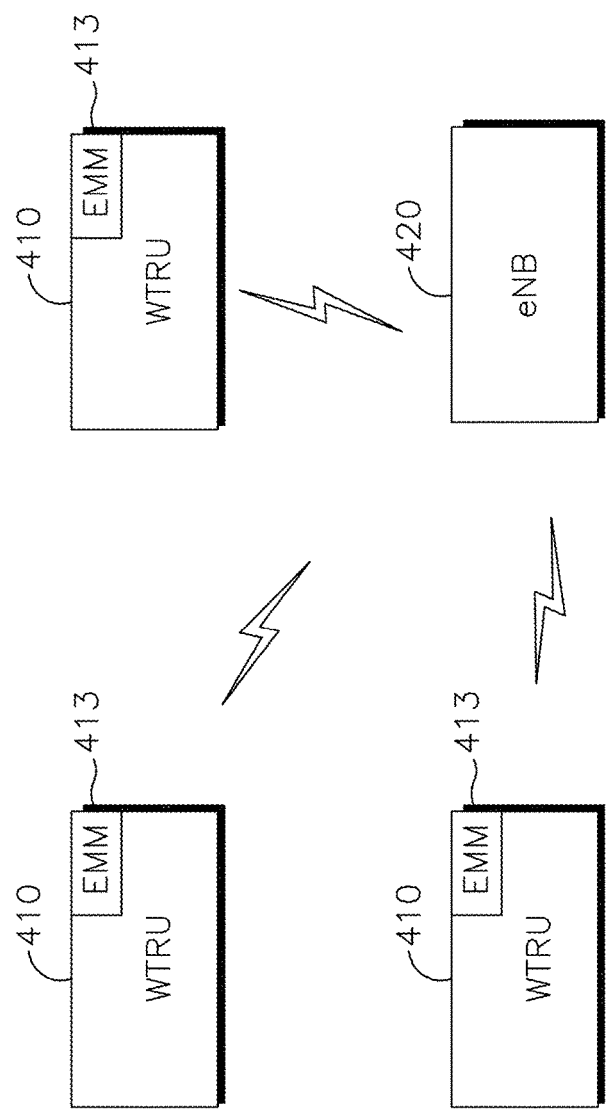
FIG. 4 shows a wireless communication system in accordance with an embodiment.

FIG. 4 shows a wireless communication system 400 in accordance with an embodiment. The communication system 400 includes a plurality of WTRUs 410 and an e Node B (eNB) 420. As shown in FIG. 4, the WTRUs 410, are in communication with the eNB 420. Although three WTRUs 410 and one eNB 420 are shown in FIG. 4, it should be noted that any combination of wireless and wired devices may be included in the wireless communication system 400.

Each of the WTRUs 410 may include an Enhanced Packet System (EPS) Mobility Management entity (EMM) 413. The WTRUs 410 may operate in one of two mobility states. When at least one of the WTRUs 410 has no non-access stratum (NAS) signaling connection between the WTRUs 410 and the eNB 420, it may be in an EMM-IDLE mode. When one of the WTRUs 410 establishes an NAS signaling connection, it is in an EMM-CONNECTED mode.

Each of the WTRUs 410 may use a service request procedure to transfer their EMM mode from EMM-IDLE to EMM-CONNECTED and to establish radio bearers to send uplink (UL) user data. UL data is data that is sent from the WTRUs 410 to the eNB 420.

The service request procedure may also be used to invoke a mobile originating (MO) or mobile terminating (MT) circuit switched (CS) fallback procedure. The procedure may also be used when the network has downlink (DL) signaling pending, one of the WTRUs 410 has UL signaling pending, one of the WTRUs 410 or the eNB 420 has user data pending and the WTRU for which the user data is intended is in EMM-IDLE mode, or when one of the WTRUs 410 is in EMM-IDLE or EMM-CONNECTED mode and has requested to perform MO or MT CS fallback.

The service request procedure may be initiated by at least one of the WTRUs 410. However, for DL signaling or transfer of user data while a WTRU is in EMM-IDLE mode, a trigger may be sent by the eNB 420 in a paging message. The WTRU targeted by the paging message may invoke the service request procedure when the WTRU receives the paging message, has pending user data to be sent, or has pending UL signaling. A WTRU in EMM-IDLE or EMM-CONNECTED mode may invoke the service request procedure when the WTRU receives a CS fallback request or receives a notification for a CS call, such as a page or a service notification.

Figure 1:
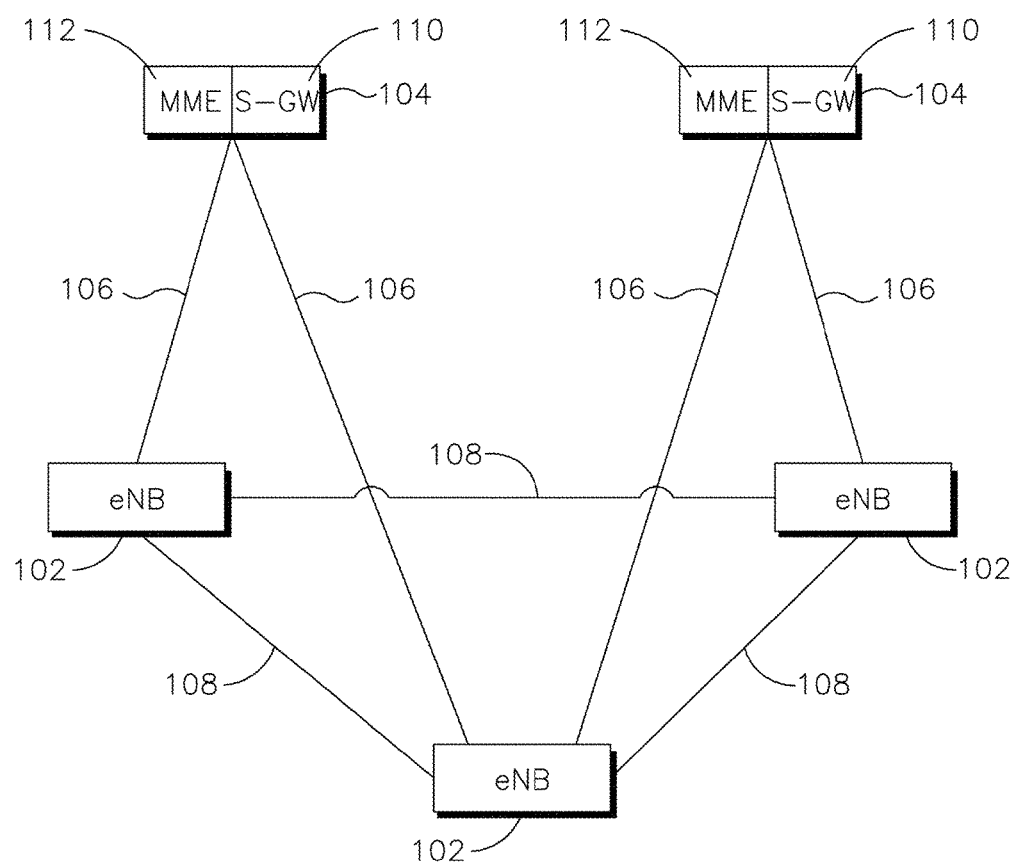
FIG. 1 shows an overview of an Evolved Universal Mobile Telecommunications System (UMTS) Terrestrial Radio Access Network (E-UTRAN) in accordance with the prior art.
Figure 2:
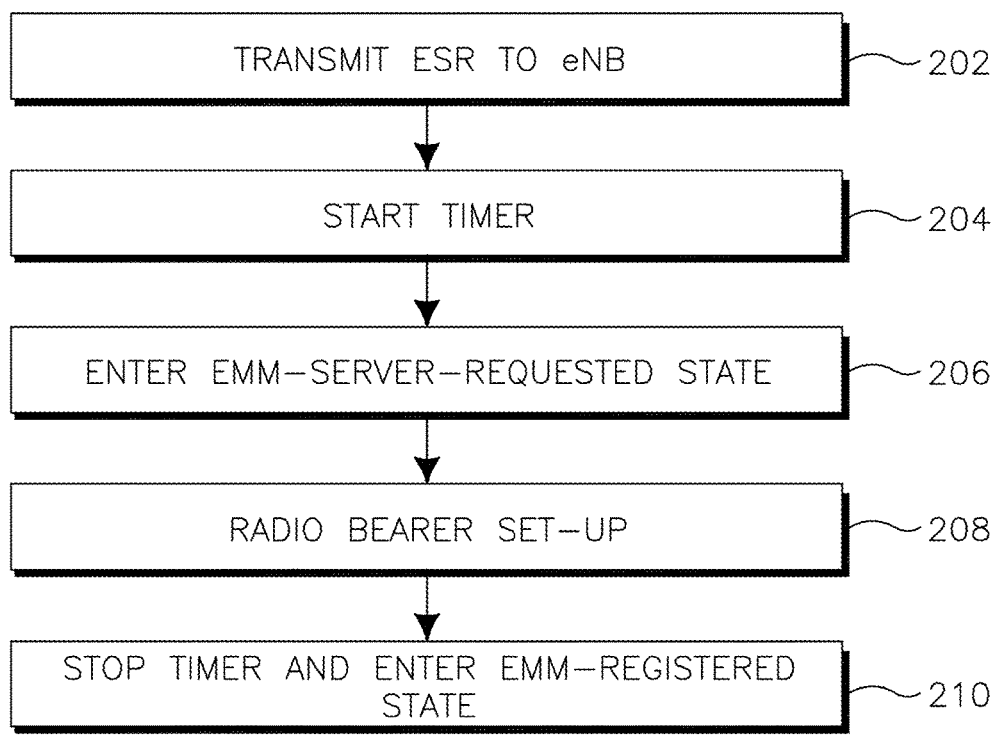
FIG. 2 is a flow diagram of a service request procedure in accordance with the prior art.
Figure 3:
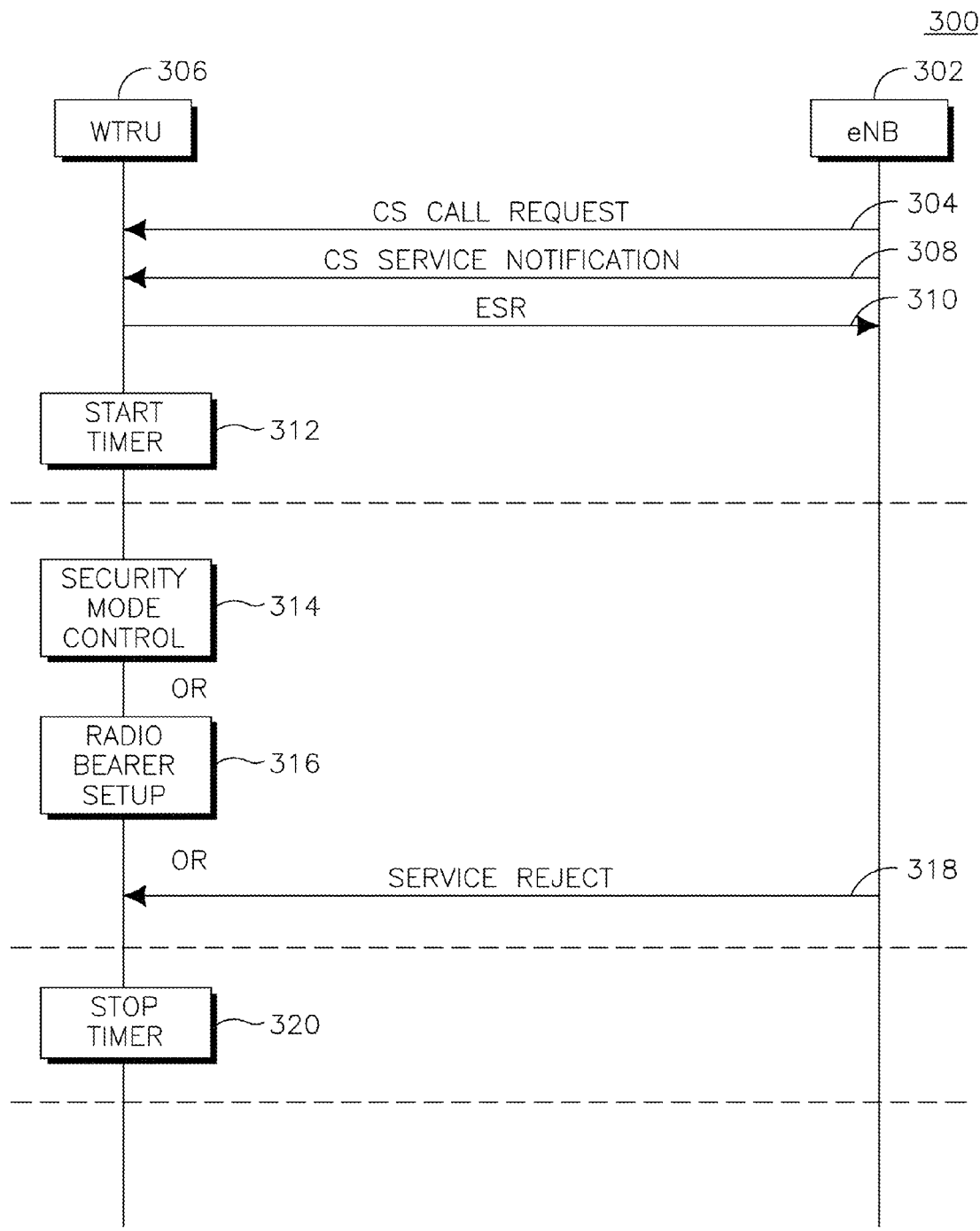
FIG. 3 is a signal diagram of a service request procedure in accordance with the prior art.
Figure 5:
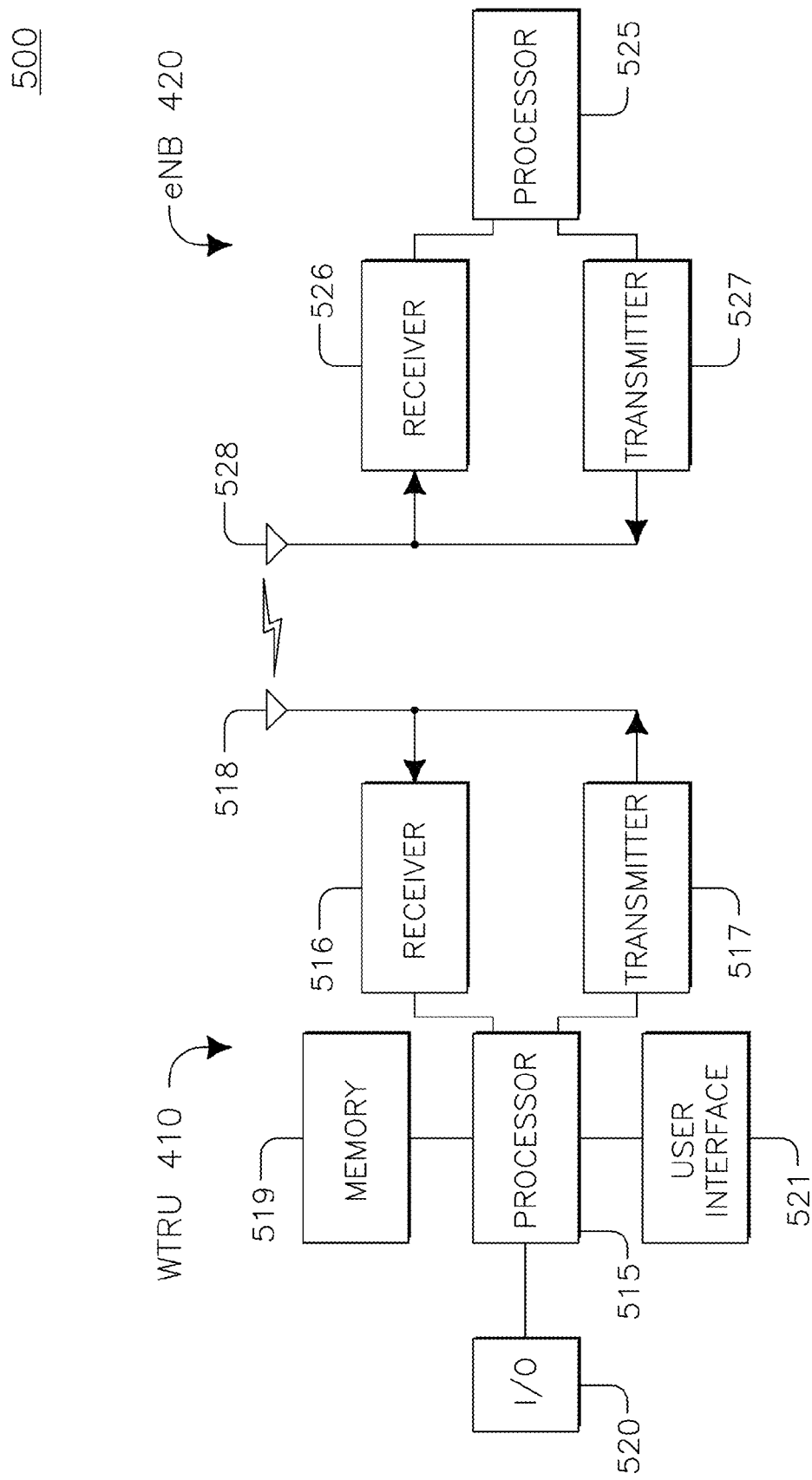
FIG. 5 is a functional block diagram of the WTRU and the eNB of the wireless communication system of FIG. 4.

FIG. 5 is a functional block diagram 500 of one of the WTRUs 410 and the eNB 420 of the wireless communication system 400 of FIG. 4. As shown in FIG. 3, the WTRU 310 is in communication with the eNB 320. In addition to the components that may be found in a typical WTRU, the WTRU 310 includes a processor 515, a receiver 516, a transmitter 517, and an antenna 518. The WTRU 310 may also include a user interface 521, which may include, but is not limited to, an LCD or LED screen, a touch screen, a keyboard, a stylus, or any other typical input/output device. The WTRU 410 may also include memory 519, both volatile and non-volatile as well as interfaces 520 to other WTRU's, such as USB ports, serial ports and the like. The WTRU 410 may also include a control device 522, such as a timer, a counter or other time or count based control devices. The control device 522 may be electrically coupled to the processor 515.

The receiver 516 and the transmitter 517 are in communication with the processor 515. The antenna 518 is in communication with both the receiver 516 and the transmitter 517 to facilitate the transmission and reception of wireless data. The WTRU may be configured with a non-access stratum entity (NAS), a radio resource control entity (RRC), a medium access control entity (MAC) and other entities that serve to process particular commands and perform particular duties. The WTRU may be configured to operate in a PS and/or a CS environment, and to receive, transmit and process both PS and CS commands. The WTRU may include counters, timers, and other devices used for timing various procedures.

In addition to the components that may be found in a typical eNB, the eNB 320 includes a processor 525, a receiver 526, a transmitter 527, and an antenna 528. The receiver 526 and the transmitter 527 are in communication with the processor 525. The antenna 528 is in communication with both the receiver 526 and the transmitter 527 to facilitate the transmission and reception of wireless data.

Figure 6:
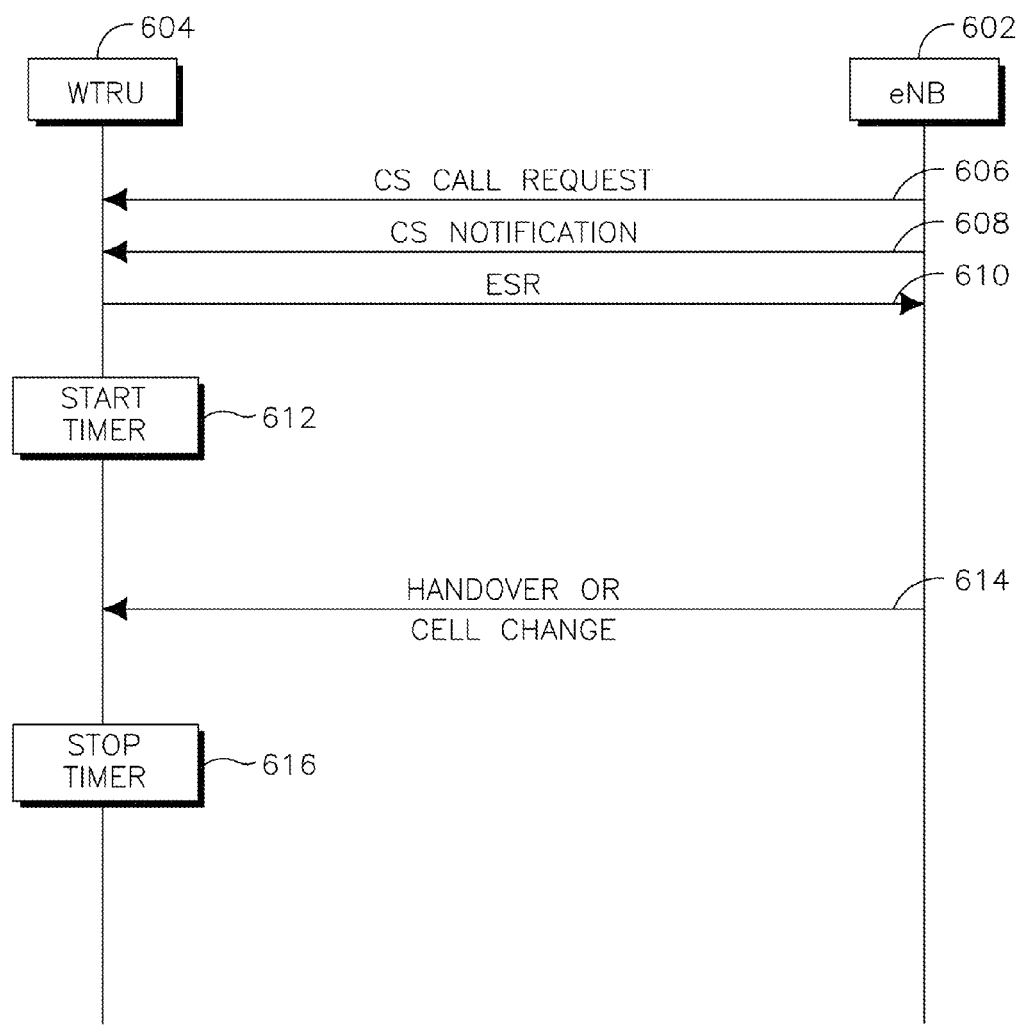
FIG. 6 shows a signaling diagram of an EMM service request procedure in accordance with an embodiment.

FIG. 6 shows a signaling diagram of an EMM service request procedure 600 in accordance with an embodiment. An eNB 602 transmits a CS call request 606 and a CS service notification 608 to a WTRU 604. The WTRU 604, which is in connected mode, transmits an extended service request 610 to the eNB 602. The WTRU starts a timer 612. The WTRU 604 receives a handover command 614 and the WTRU stops the timer 616. Therefore, along with the other criteria for stopping the timer, as shown in FIG. 6, the WTRU 604 stops the timer 616 when it receives a handover 614 or cell change command. If the timer expires prior to a mobility message being received by the WTRU 604, such as a handover command or cell change command, the procedure is aborted.

Figure 7A:
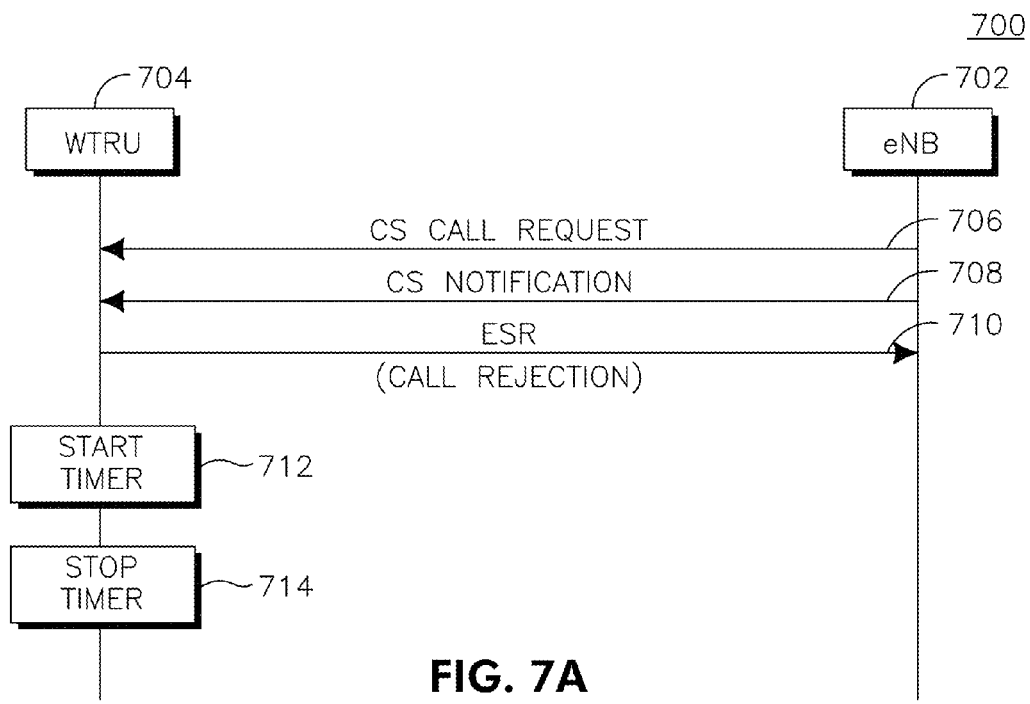
FIG. 7A is a signal diagram showing a method to operate a timer in accordance with an embodiment.

When a WTRU transmits an ESR for a CS fallback and the request is rejected, the WTRU may send an indication to the eNB, in the extended service request, that the CS call is rejected. If this occurs, a trigger may be used to stop the timer. FIG. 7A is a signal diagram showing a method to stop a timer 700 when an ESR message is sent with an indication of call rejection in accordance with an embodiment. An eNB 702 sends a CS call request 706 and a CS service notification 708 to a WTRU 704. The WTRU 704 sends an EMM service request message including a CS call rejection indication 710 to the eNB 702. The timer is started 712 once the extended service request message with the CS call rejection indication 710 is transmitted. The timer is the stopped 714. The timer may be stopped 714 immediately after the extended service request message 710 is transmitted. Alternatively, the timer may be stopped after a predetermined time has elapsed, for example, after half the time that the timer would have run if the CS call was accepted The NAS entity may receive a notification from a lower layer entity, such as the RRC or MAC, for example, that acknowledges the transmittal of the ESR. The notification may be used as a trigger to stop the timer.

Figure 7B:
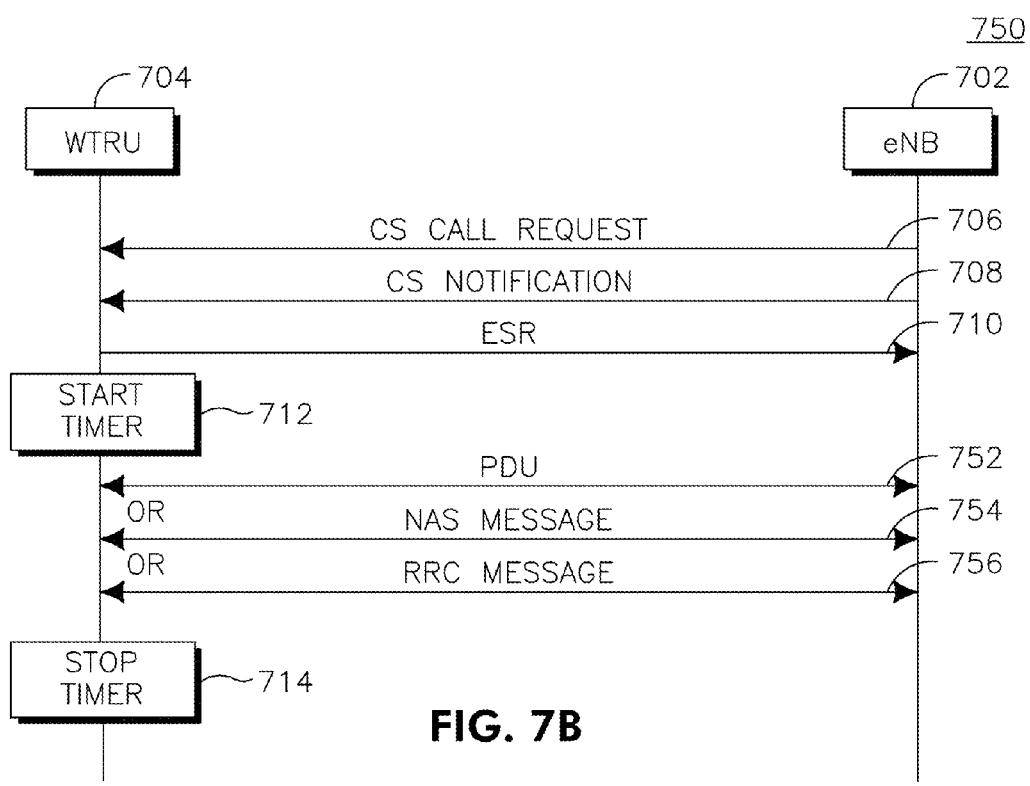
FIG. 7B is a signal diagram showing a method to operate the timer in accordance with another embodiment.

FIG. 7B is a signal diagram showing a method to stop a timer 750 when an ESR message is sent with an indication of call rejection in accordance with another embodiment. The eNB 702 sends the CS call request 706 and the CS service notification 708 to the WTRU 704. The WTRU 704 sends the ESR message including a CS call rejection indication 710 to the eNB 702. A protocol data unit (PDU) 752, an NAS message, such as a NAS message from the eNB to the WTRU to acknowledge receipt of the ESR 754, or an RRC message 756, is sent from or to the WTRU 702. The receipt or transmission of the message triggers the WTRU to stop the timer 714.

Alternatively, the timer may be allowed to expire without the WTRU 702 determining that the expiration of the timer indicates a problem. Furthermore, the timer may not be started at all if the CS call is rejected. The stopping of the timer indicates the fallback procedure was completed successfully.

The present disclosure, while directed to a timer, may be applicable to any number of control devices, such as counters, for example. A timer, as used in herein, is an example of a control device.

Although features and elements are described above in particular combinations, each feature or element can be used alone without the other features and elements or in various combinations with or without other features and elements. The methods or flow charts provided herein may be implemented in a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) or Ultra Wide Band (UWB) module.

What is claimed is:

1. A Wireless Transmit/Receive Unit (WTRU), comprising:
a timer;
a receiver configured to receive a circuit switched (CS) service notification for a CS call;
a processor configured to determine that a CS fallback procedure associated with the CS call is accepted, and generate an evolved packet system mobility management extended service request (ESR) message including information indicating the determined acceptance; and
a transmitter configured to transmit the generated evolved packet system mobility management ESR message,
wherein:
the WTRU is in a connected mode,
the processor is configured to start the timer in response to transmitting the generated ESR, and stop the timer in response to reception by the receiver of a handover command and completion of the CS fallback procedure, and
the handover command directs the WTRU to handover to another radio access technology (RAT) so that the CS call may be established.

2. A Wireless Transmit/Receive Unit (WTRU) comprising:
a timer;
a receiver configured to receive a circuit switched (CS) service notification for a CS call;
a processor configured to determine that a CS fallback procedure associated with the CS call is accepted, and generate an evolved packet system mobility management extended service request (ESR) message including information indicating the determined acceptance; and
a transmitter configured to transmit the generated evolved packet system mobility management ESR message,
wherein:
the WTRU is in a connected mode,
the processor is configured to start the timer in response to transmitting the generated ESR, and stop the timer in response to reception by the receiver of a cell change command and completion of the CS fallback procedure, and
the cell change command directs the WTRU to perform a cell change procedure.

* * * * *